United States Patent [19]

Linder

[11] Patent Number: 5,386,807
[45] Date of Patent: Feb. 7, 1995

[54] DEVICE FOR ADJUSTING THE ROTATIONAL ANGLE RELATIONSHIP BETWEEN A CAMSHAFT AND ITS DRIVE ELEMENT

[75] Inventor: Ernst Linder, Mühlacker, Germany

[73] Assignee: Robert Bosch GmbH, Stuttgart, Germany

[21] Appl. No.: 966,149

[22] PCT Filed: Apr. 25, 1992

[86] PCT No.: PCT/DE92/00334

§ 371 Date: Jan. 5, 1993

§ 102(e) Date: Jan. 5, 1993

[87] PCT Pub. No.: WO92/20906

PCT Pub. Date: Nov. 26, 1992

[30] Foreign Application Priority Data

May 17, 1991 [DE] Germany .............. 4116169

[51] Int. Cl.⁶ .............................................. F01L 1/34
[52] U.S. Cl. .............................. 123/90.17; 123/90.31
[58] Field of Search ............. 123/90.15, 90.17, 90.31

[56] References Cited

U.S. PATENT DOCUMENTS

| | | | |
|---|---|---|---|
| 4,895,113 | 1/1990 | Speier et al. | 123/90.17 |
| 5,056,477 | 10/1991 | Linder et al. | 123/90.17 |
| 5,170,755 | 12/1992 | Kano et al. | 123/90.17 |
| 5,172,659 | 12/1992 | Butterfield et al. | 123/90.17 |
| 5,189,999 | 3/1993 | Thoma | 123/90.17 |

FOREIGN PATENT DOCUMENTS 388244 9/1990 European Pat. Off. .
4032586 4/1991 Germany .

*Primary Examiner*—E. Rollins Cross
*Assistant Examiner*—Weilun Lo
*Attorney, Agent, or Firm*—Michael J. Striker

[57] ABSTRACT

The adjustment device for continuously adjusting an angular orientation of a camshaft of an internal combustion engine relative in relation to a drive wheel of the engine, has a servomotor including a rotary piston non-rotatably attached to the camshaft and a plurality of adjusting segments between the rotary piston and the drive wheel equally spaced around the outer peripheral surface of the rotary piston and alternately attached to the rotary piston and the drive wheel so as to form a plurality of volume-adjustable working chambers connectable in pairs in operation; a pump located in the drive wheel and connected with the servomotor to receive an adjustably pressurized medium and to feed the adjustably pressurized medium to the servomotor means; a first control valve device connected to the pump for controlling supply of the adjustably pressurized medium to the pump to activate and deactivated the pump; and a second control valve device connected to the working chambers to select working chamber pairs and to connect the working chambers of the selected working chamber pairs to provide a flow of pressurized medium between those working chambers and thus to adjust the angular orientation of the camshaft relative to the drive element. Advantageously four pair of working chambers are provided including a third and fourth pair arranged diametrically opposed to each other on opposite sides of the rotary piston.

19 Claims, 5 Drawing Sheets

DEVICE FOR ADJUSTING THE ROTATIONAL ANGLE RELATIONSHIP BETWEEN A CAMSHAFT AND ITS DRIVE ELEMENT

BACKGROUND OF THE INVENTION

The invention concerns a device for adjusting the rotational angle relationship of a camshaft to a drive wheel or element of an internal combustion engine.

An adjustment device for continuously adjusting the angular relationship of a camshaft for actuating gas exchange valves of an internal combustion engine relative to its drive element is known, comprising a servomotor which is actuated by a pressurized medium, in particular a hydraulic medium, and which has working chambers whose enclosed volumes can be increased or reduced by predetermined volume amounts during an adjustment.

In an adjustment device known from EP-A-0 163 046, two hydraulic servomotors are provided on a diameter of a part connected to the camshaft and each of these is equipped with a servopiston which acts via a roller on a ramp which is located on a drive gearwheel radially surrounding the part connected to the camshaft. The two servomotors are separately subjected to pressure and the pressure is controlled by separate valves. The servomotors are triggered by a valve arrangement in such a way that the outwardly moved piston of one servomotor is subjected to pressure and the working space of the other, opposite servomotor is relieved so that the piston of this servomotor can deflect following the ramp. In the case of uneven pressure in the servomotors, the servopiston is displaced and the roller acts both on the ramp of the drive wheel and on the shaft. This angular adjustment can take place in both directions.

Although the oil pressure source present in an internal combustion engine for lubrication purposes can be employed as the drive means for adjusting the camshaft, it only generates a relatively low pressure and is also limited with respect to the delivery volume per unit time. Furthermore, the additional pressurized medium consumption is substantial so that the use of a larger oil pressure source is necessary. A separate high pressure pump, on the other hand, requires more components and energy consumption. In addition, the device proposed is also complicated because two separate magnetic valves or a three-position valve must be employed in order to trigger the two servomotors.

SUMMARY OF THE INVENTION

It is an object of the present invention to provide.

The invention is based on the object of providing a device which permits, for a minimum pressurized medium requirement, a continuous, i.e. rapid advance or retardation, dependent on a characteristic map, of the camshaft relative to the camshaft drive wheel, even in the lower rotational speed range.

According to the invention, the adjustment device continuously adjusts an angular orientation of a camshaft of an internal combustion engine relative to a The invention is based on the knowledge that the alternating torque on a camshaft relative to the camshaft drive wheel can well be used for an advance or retardation in the upper rotational speed range, the pressure peaks arising due to the torque fluctuations being used as an additional pressure source for setting purposes. In the lower rotational speed range, on the other hand, an additional auxiliary force has to be employed in order to compensate appropriately for the difference occurring, in this rotational speed range, between the necessary pressure force and the actually occurring pressure force due to the torque fluctuations so that a sufficiently rapid adjustment of the camshaft can be realized.

In addition to a hydraulic servomotor necessary for the adjustment, the device according to the invention has, therefore, pump means. An additional adjustment component is generated, particularly in the lower rotational speed range of the internal combustion engine, by this pump means which, according to the invention, is embodied as a ball piston pump and, located in the drive system of the camshaft, forms a complex unit with the hydraulic servomotor means.

In accordance with a preferred embodiment of the invention, a two-cylinder ball piston pump with a two strike cam is provided. The pump is symmetrically constructed so that there are two strokes per revolution for each cylinder of the internal combustion engine and this permits complete balance, in an advantageous manner, of the transverse forces on the camshaft to be controlled.

The cam of the ball piston pump is advantageously a cam ring having oval, elliptical, trochoidal or sine squared cross section.

The piston pump embodied in such an integrated way and, therefore, very compact in construction, can be controlled electromagnetically. For this purpose, in an advantageous further development of the invention, a first control valve means for the piston pump means is combined in a common control unit with a second control valve means for shutting off working chambers within the servomotor. By this means, the adjustment of the rotational angle relationship between the camshaft and the camshaft drive wheel can, if required, be influenced in a simple manner by the output of the pump means. The first control valve means and the second control valve means are combined in the control means. They can advantageously, therefore, be actuated jointly by an electromagnet.

This provides the advantage that only one control means is required for the rotational angle adjustment necessary between the camshaft and the drive wheel of the camshaft and only one hydraulic system, namely the lubricant circuit of the internal combustion engine, is necessary.

In order to ensure the necessary hydraulic interaction between the integrated ball piston pump and the servomotor means for adjusting the camshaft, the servomotor means has, according to the invention, eight working chambers which operate together in pairs and symmetrically. The working chambers are volumes which are located in a circular action region which is provided between the rotary piston of the servomotor means and the drive wheel of the camshaft. The volumes of the working chambers are formed by free spaces which exist between adjusting segments located in the action region. The respective adjusting segments are fastened alternately on the inside of the camshaft drive wheel and on the outside of the rotary piston of the servomotor means feather keys.

It is essential to the invention for two of the eight working chambers of the servomotor means to be respectively connected to one of the two pressure chambers of the piston pump means. The two servomotor working chambers mentioned are located diametrically opposite. At the same time, first connecting conduits the connecting conduit between the two working chambers of the servomotor means and the pressure chambers of the piston pump means can be connected to the lubricating oil circuit by means of the first control valve means of the common control means.

Two other chambers of the eight working chambers of the servomotor means are vented. These are located diametrically opposite to one another and are respectively located adjacent to the servomotor means working chambers which are connected to the pressure chambers of the ball piston pump used.

The foregoing pressure chambers, together with the remaining four chambers of the servomotor means, are controlled by the control means mentioned above.

The remaining four chambers are divided into two groups, one group of two being respectively located between a vented working chamber and a servomotor working chamber connected to the pressure chamber of the ball piston pump. The individual chambers of the two chamber pairs are configured, in accordance with the invention, so that they can be hydraulically connected together in respective pairs by a conduit via the second control valve of the control, which also controls the ball piston pump.

When the magnet winding of the control is not supplied with current, the chambers of the chamber pairs are respectively shut off from one another by means of the second control valve means of the control, on the one hand, and the first connecting conduits which are provided between the servomotor means and the ball piston pump have a connection to the lubricant circuit of the internal combustion engine via, in each case, the first control valve means of the control means, on the other. When the control means is triggered, the two chamber pairs of the servomotor means are connected by the second control valve means and, at the same time, the pressure chambers of the ball piston pump and the lubricant supply are disconnected by means of the first control valve. In accordance with the invention, this has the effect that the ball piston pump can become active from the point of view of pressure and that an exchange of flow medium (lubricant) can take place between the individual associated chambers of the chamber pairs under the action of the torque at the camshaft. The adjustment procedure at the camshaft has been initiated.

The suction or pressure effect of the ball piston pump is used, depending on the position of the corresponding control cam of the camshaft on the particular valve tappet of the inlet valve of the internal combustion engine, to adjust to advance or retard. The flow direction in the associated chamber pairs of the servomotor means then reverses.

The control takes place, according to the invention, in such a way that the piston pump only provides pressure for an adjustment of the camshaft in the advance direction in the lower rotational speed range if this is required for a higher engine output power. By this means, the advantages of the adjustment principle—the continuous adjustment and the internal exhaust gas recirculation which can be achieved by it—can also be used in the lower rotational speed range.

The exhaust gas figures and performance parameters of the internal combustion engine can also be substantially improved by means of this adjustment principle. The torque increases by 15% in the lower rotational speed range and the $NO_x$ and CH emission are respectively reduced by 40 and 20%.

BRIEF DESCRIPTION OF THE DRAWING

Advantageous further developments of the invention are characterised in the claims and are presented below, together with the description of the preferred embodiment of the invention, by means of the figures in which.

DESCRIPTION OF THE PREFERRED EMBODIMENTS

Figure 1:
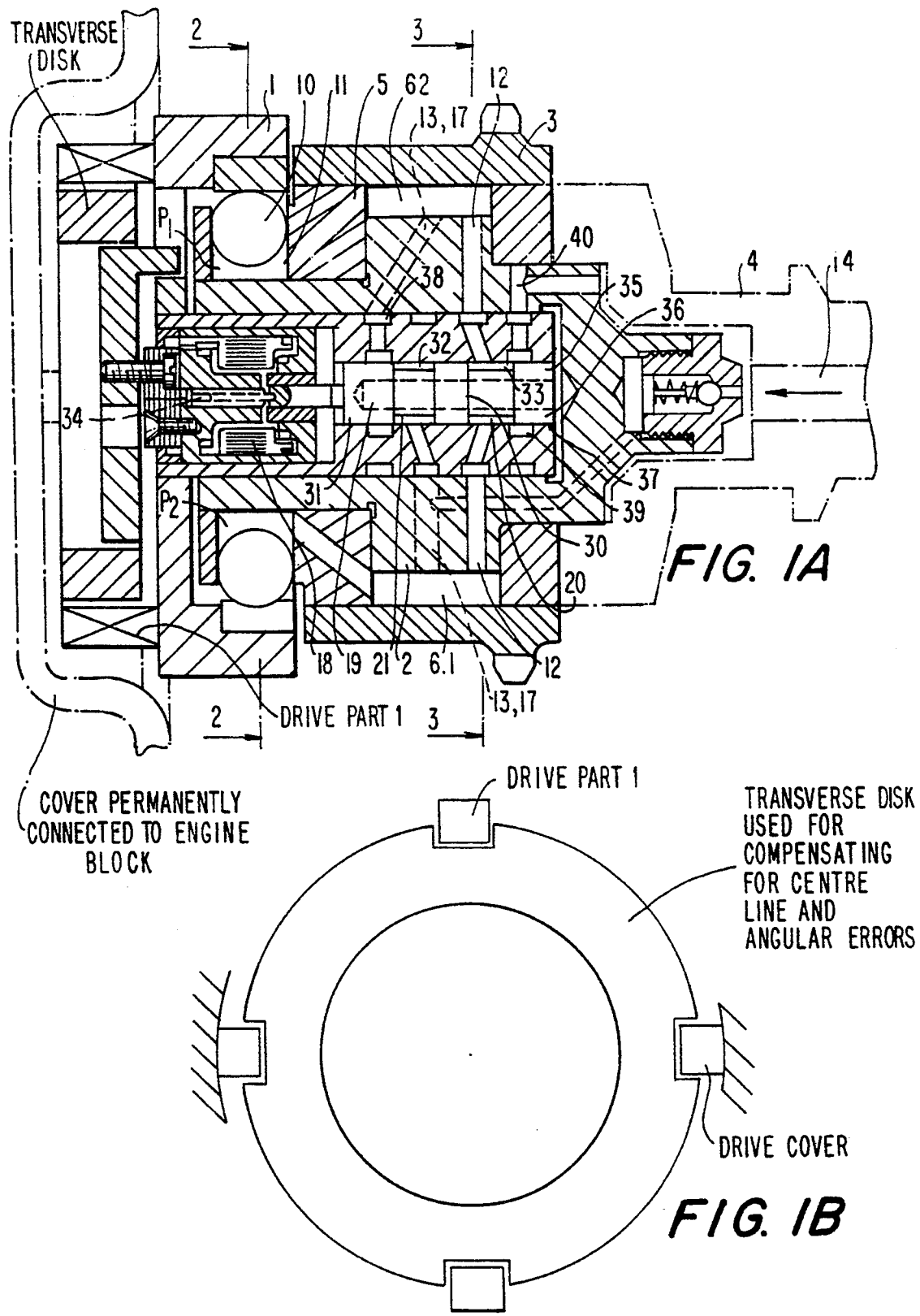
FIG. 1 is a longitudinal cross-sectional view through the camshaft adjustment device according to the invention.

The structure construction of a preferred embodiment of the camshaft adjustment device according to the invention is shown in the longitudinal section of FIG. 1. The adjustment device consists of a servomotor 2 and pump means 1 which, together with a control means 19, is arranged as a complex subassembly at the end of the camshaft 4. The hydraulic coupling between the pump means 1 and the servomotor 2 takes place by two first connecting conduits 5. A connection is made by this means between the two pressure chambers 11 of pump means 1 and the corresponding first and second working chambers 6.1 and 6.2 which together form a second pair of the working chambers. The connection to the lubricant circuit of the internal combustion engine necessary for the desired mode of operation of the pump means 1 takes place via second connecting conduits 12 in association with the first control valve 20 of the control unit 19.

In accordance with the invention, the control means 19 contains the first control valve 20 and a second control valve 21 for the purpose of connecting the working chambers 6.1 and 6.2. The control valves 20 and 21 are jointly actuated by an electromagnet 18 so as to carry out the switching functions which are necessary for an angular adjustment between the camshaft 4 and the camshaft drive wheel 3.

In addition to its compactness, the advantage of the adjustment device according to the invention consists particularly in the fact that the pump means 1, configured as a simple ball piston pump, is only switched on, by the control means 19, when required. There is therefore no need for the pump mean 1 to work continuously against a positive pressure. This implies a substantial saving in energy and is reflected in a higher power output of the internal combustion engine.

Figure 2:
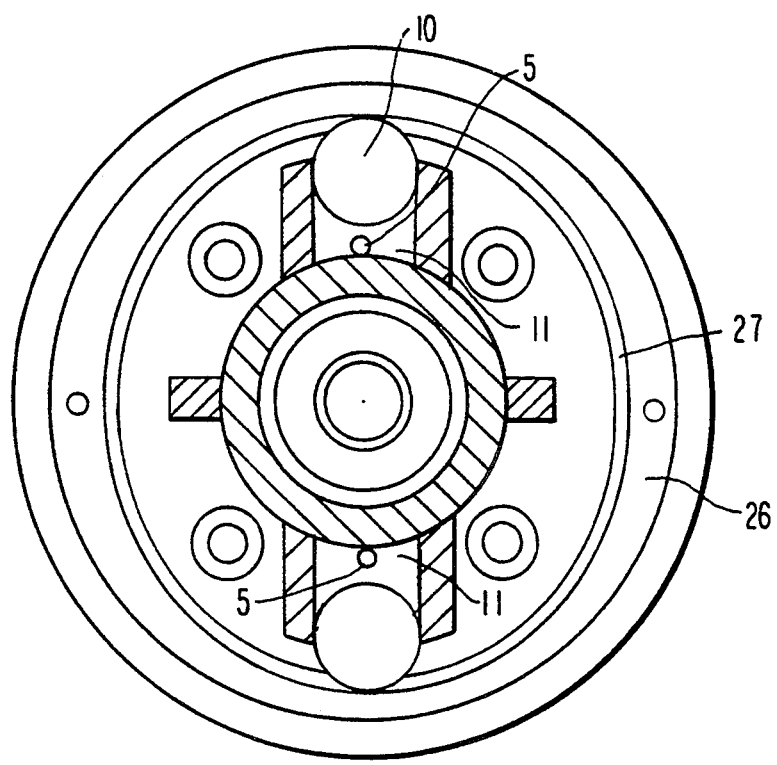
FIG. 2 is a longitudinal cross-sectional view along the line A..A through the camshaft adjustment device according to the invention.

The ball piston pump 1 is presented in a simplified manner in FIG. 2, which shows a cross-section along the line A..A of FIG. 1. It involves, in a preferred embodiment of the invention, a two-cylinder pump with a symmetrically arranged two stroke cam. This provides two strokes per revolution for each cylinder of the internal combustion engine and any possible transverse forces on the camshaft are completely balanced because of the symmetry. The pump pistons 10, configured as balls, rotate with the camshaft 4 and roll on a cam ring 26 which is secured against rotation by a transverse disk shown in more detail in FIG. 1. Due to the non-circular shape of the cam stroke of the cam ring 26, radial motion of the ball pistons 10 takes place when there is rotary motion of the camshaft 4. Pressure can therefore build up under certain conditions in the pressure chambers 11 of the pump means 1 and this can be used for the adjustment procedure. The pressure builds up whenever the connection to the lubricant circuit of the internal combustion engine 14 has been interrupted by means of the first control valve 20 of the control means 19. The pressure which builds up is fed via the connecting conduits 5 to the working chambers 6.1 and 6.2 of the servomotor 2 and thus supports the camshaft adjustment procedure which is introduced by the pressure effect of the relatively small torque fluctuations at low engine rotational speeds.

Figure 3:
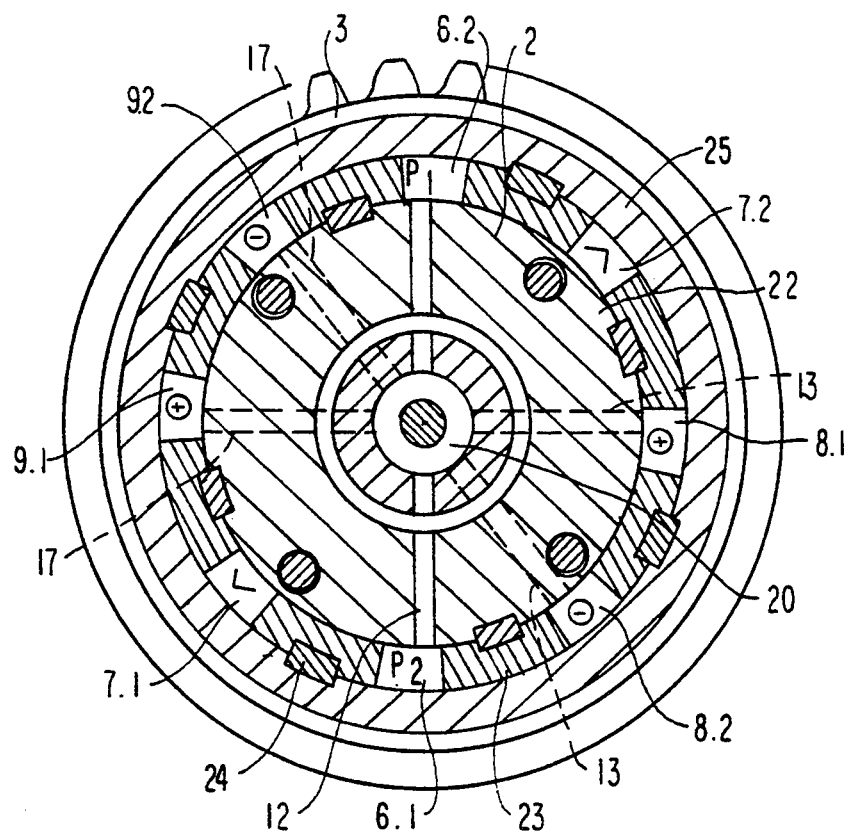
FIG. 3 is a cross-sectional view along the line B..B through the camshaft adjustment device according to the invention, FIG. 4 in a partially cross-sectional action view in accordance with FIG. 3 in association with a valve tappet and the associated control cam.

The structure of the servomotor 2 according to the invention is presented in cross-section (section along the line B . . . B of FIG. 1) in FIG. 3. The eight working chambers 6.1, 6.2, 7.1., 7.2, 8.1, 8.2, 9.1 and 9.2 are symmetrically distributed in a circular action region between the outside of the rotary piston 22 of the servomotor 2 and the inside of the drive wheel 3 of the camshaft 4.

The working chambers are closed volumes, each of which is located between the adjusting segments 23 arranged at equal distances on the rotary piston 22 of the servomotor 2 and on the camshaft drive wheel 3. The adjusting segments 23 are fastened on the outer peripheral surface of the rotary piston 22 and on an inner surface of the drive wheel 3 of the camshaft 4 in a simple manner by means of feather keys 24.

The working chambers are offset in pairs by 180° in each case and this effects an advantageous reduction in the frictional forces during the adjustment procedure. In this way, the servomotor 2 can be made compact and, more particularly, can be manufactured at a favorable cost because, in particular, the feather keys 24 and the adjusting segments 23 can be produced at a favorable price even when the level of fitting accuracy is high.

The working chambers 6.1 and 6.2 are connected to the first control valve 20 via the second conduits 12 which pass through the rotary piston 22 of the servomotor 2. This is the condition for a connection being produced, in association with the conduits 5 (shown in FIG. 1), between the lubricant circuit of the internal combustion engine 14 and the pressure chambers 11 of the pump means 1 when the control means 19 initiates a switching procedure.

Two remaining working chambers 7.1 and 7.2 which together form a second pair of the working chambers, arranged adjacent to the working chambers 6.1 and 6.2 which can be connected to the pump means 1, are also offset by 180° relative to one another and are respectively vented, according to the invention, by holes 25 present in the camshaft drive wheel 3.

The remaining four working chambers 8.1, 8.2, 9.1 and 9.2 of the servomotor 2 are combined into a third chamber pair and a fourth chamber pair diametrically opposite to one another and offset by 180°. The individual working chambers of the chamber pairs 8.1, 8.2 and 9.1, 9.2 are hydraulically connected together by third and fourth connecting conduits 13 and 17. When no current is supplied to the control means 19, the pairs of chambers are shut off from one another by the control valve 21. The opening procedure for the pairs of chambers takes place by means of a switching procedure in the control means 19 when an angular offset change between the camshaft 4 and the camshaft drive wheel 3 is to be performed by the servomotor 2. In this case, the second control valve 21 comes into action (see FIG. 1). In accordance with the symmetry conditions recognized as being advantageous, the third and fourth chamber pairs 8.1, 8.2 and 9.1, 9.2 are, according to the invention, respectively arranged between a vented working chamber 7.1 or 7.2 and a working chamber 6.1 or 6.2 located in the action region between the camshaft drive wheel 3 and the rotary piston 22 of the servomotor 2 and connected to one of the pressure chambers 11 of the pump means 1.

With the exception of the vented working chambers 7.1 and 7.2, all the chambers of the servomotor 2 are filled with lubricant from the lubricant circuit of the internal combustion engine 14 as working medium.

Figure 4:
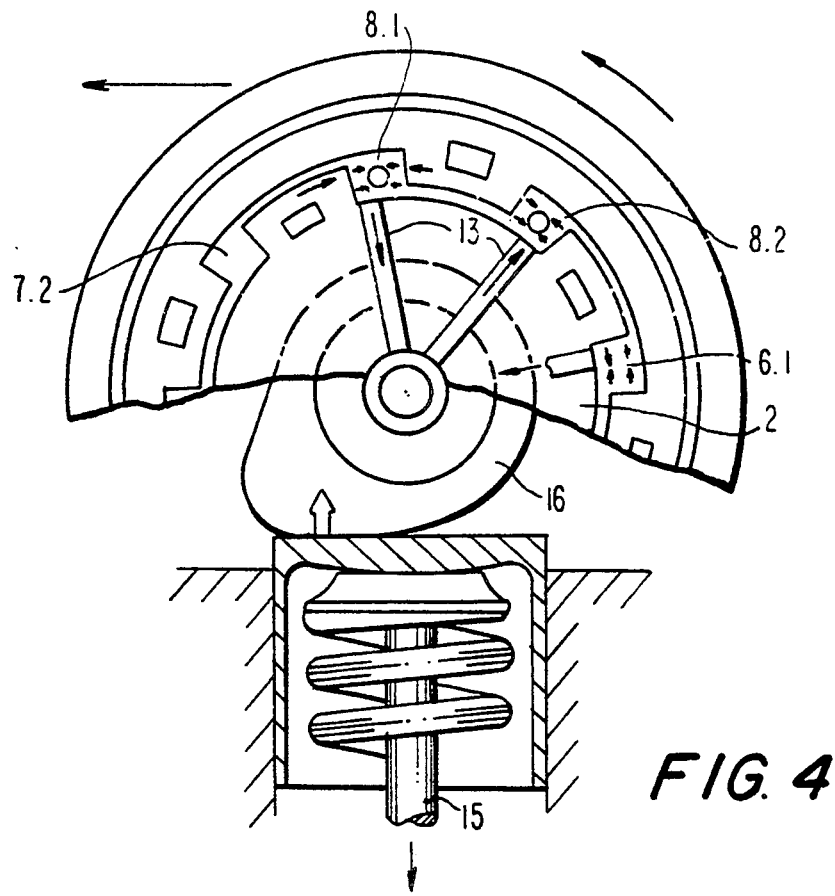
Figure 5:
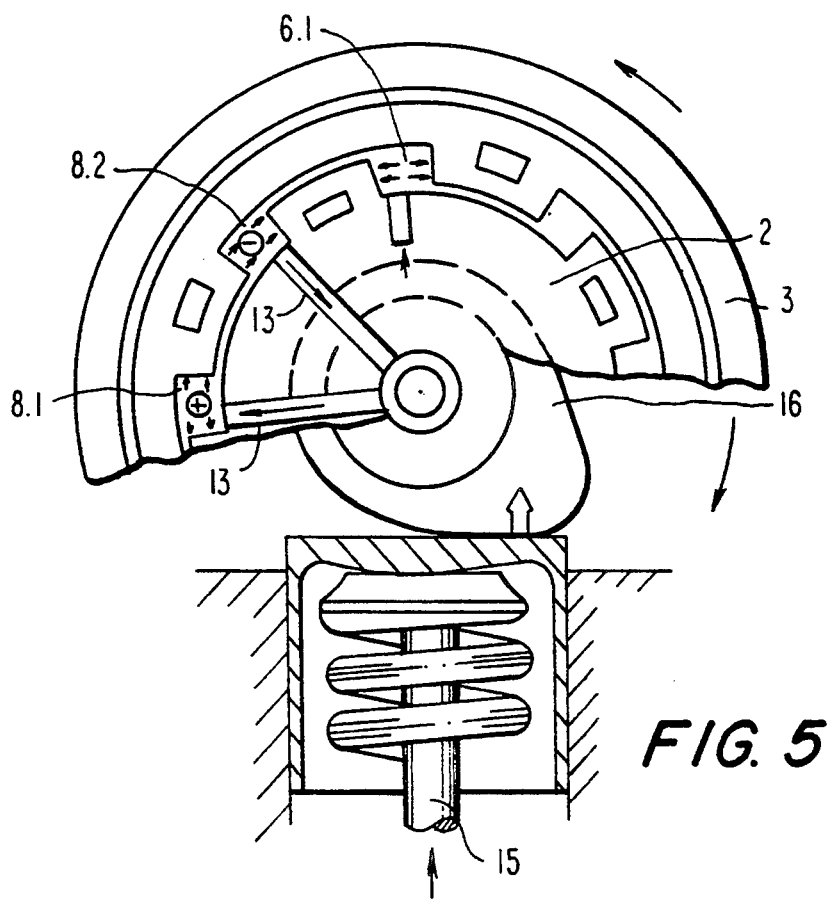
FIG. 5 is a partially cross-sectional action view in accordance with FIG. 4 after the camshaft has rotated by a further 90°.

FIGS. 4 and 5 each represent a partial view of the servomotor 2 in association with a cam 16, influenced by it, of the camshaft 4 and a corresponding inlet valve tappet 15 of the internal combustion engine to be controlled.

FIG. 4 shows the action mechanism of the servomotor 2 for an inlet valve which is opening on one cylinder of the internal combustion engine. The control means 19 has actuated the first and second control valves 21 and 22 so that the third and fourth working chamber pairs 8.1, 8.2; 9.1, 9.2 are no longer shut off and the chambers 6.1 and 6.2 (and therefore also the pressure chambers 1.1 of the pump means 1) are separated from the lubricant circuit of the internal combustion engine 14. The tappet 15 of the valve is driven by the cam 16 against the action of the valve spring. In the servomotor 2, the lubricant flows via the second control valve 21 (not shown) of the control means 19 from the working chamber 8.1 to the working chamber 8.2. The pump means 1 supports this procedure by inducing medium from the working chamber 6.1 of the servomotor 2. By this means, an adjustment towards "retard" takes place at the camshaft 4.

FIG. 5 shows the same arrangement but after the camshaft 4 has rotated by a further 90°. The inlet valve is executing a closing motion, i.e. the valve tappet is driving the cam 16. In this case, the lubricant is flowing over from the working chamber 8.2 to the working chamber 8.1 via the control valve 21 of the control means 19. The pump means 1 supports this procedure by a corresponding pumping effect and delivers lubricant into the working chamber 6.1. An adjustment of the camshaft 4 towards "advance" takes place.

The working chambers 6.2, 9.1 and 9.2 not shown in FIGS. 4 and 5 correspondingly support the adjustment procedure of the servomotor 2 in the form previously described and therefore contribute in an advantageous manner to the fact, that because of this symmetrical mode of operation of the servomotor 2, there are no undesirable transverse force effects on the camshaft 4.

Figure 6:
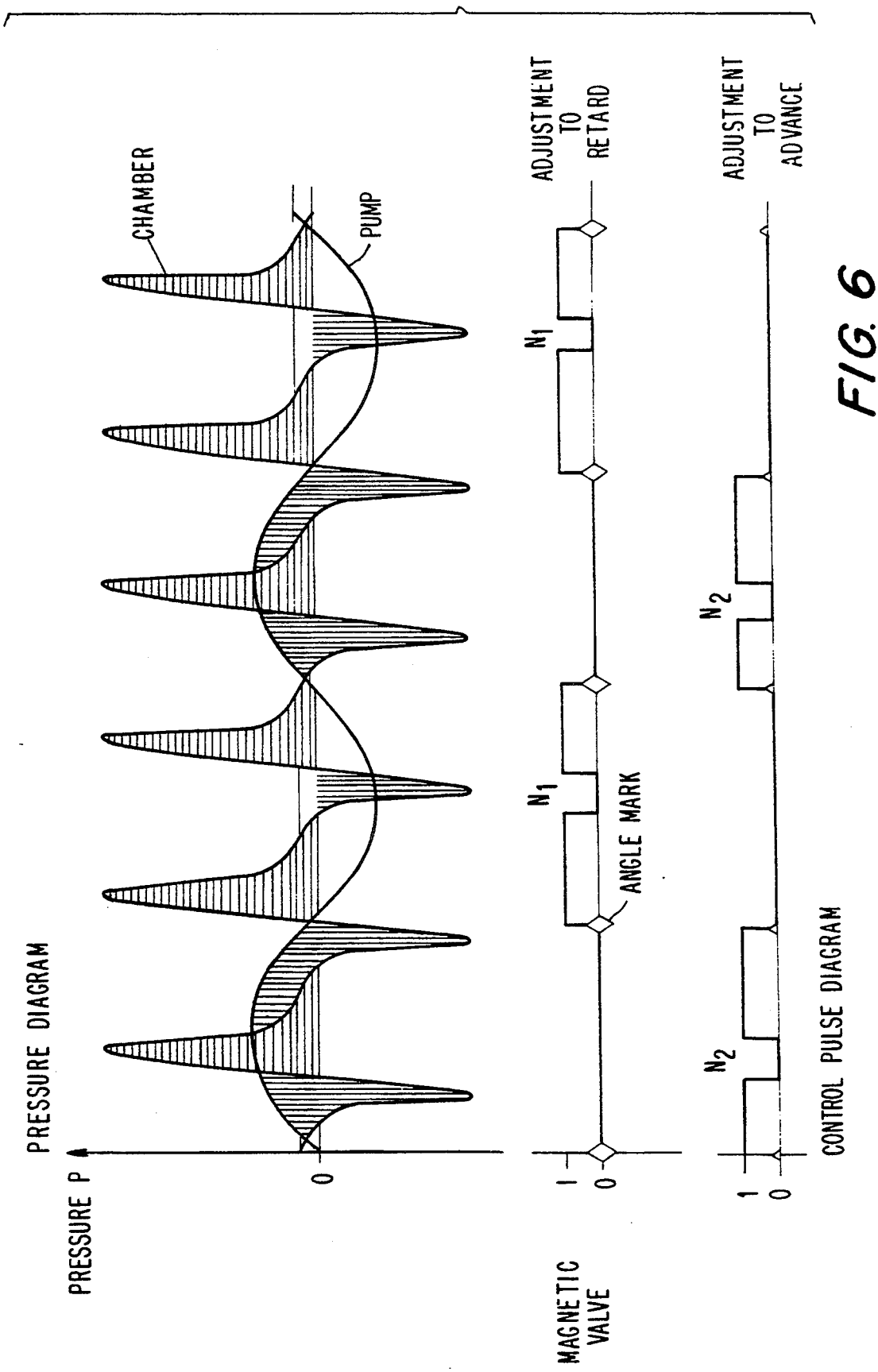
FIG. 6 is a diagrammatic illustration of the relationship of pressure in the servomotor means and the pump means to the associated variation of the control pulse for the control unit, referred to one camshaft revolution in a six-cylinder engine.

The pressure relationships in the third and fourth chamber pairs 8.1, 8.2 and 9.1, 9.2 necessary for the adjustment strategy of the setting device according to the invention and the pressure variation in the pump means 1, together with the control pulse variations for the control means 19 corresponding to it, are presented in a diagram as a function of the rotation of the camshaft 4 for a six-cylinder engine in FIG. 6. Depending on the phase position of the switch-on period of the electro magnet coil 18 of the control unit 19, there is an adjustment to advance (pump pressure effect) or an adjustment to retard (pump suction effect) the camshaft 4 due to the pressure or suction effect of the additional pump being superimposed on the pressure in the chambers. The desired phase position of the individual pressure variations can be set by appropriate adjustment of the cam ring 26 of the pump means 1.

It has been found advantageous to block, by pulses, the superimposed pressures occurring in the rotational angle regions N1 and N2 of the camshaft 4 by means of the control means 19. This is because an undesirable advance occurs in the region N1 and an extremely high pressure loading on the ball piston 10 of the pump 1 occurs in the upper rotational speed range in the region N2.

The control pulses for energizing the electro magnet coil 18 in the control means 19 are initiated by an angle mark signal generator which scans the position of the camshaft 4. The angle mark signal generator is attached to the valve cover, which is made of plastic and which is used for fastening the magnet 18 to the control means 19. Because the angle mark signal generator operates inductively, essential individual parts of the pump means 1, such as the cam ring carrier and the transverse disk, are manufactured from magnetically non-conducting material, e.g. V2A steel.

The structure and operation of control means 19 is now explained in more detail.

In FIG. 1 the control means 19 is shown in the closed position. The control means 19 has a sliding member 37, which is slidable in the passage 35 and is movable when a current flows through the adjusting magnet winding 18. When the magnet winding 18 is not energized, the sliding member 37 is held by the spring 34 in the closed position shown in FIG. 1.

The sliding member 37 has a first peripheral circular groove 32 and a second peripheral circular groove 33. A collar 30 is located between and bounds these grooves. The first groove 32 is bounded on the other side by a left control piston 31 and the second groove 33 is bounded by a right control piston 35. In the position shown in the drawing FIG. 1, the left control piston 31 closes another circular groove 38 from the first circular groove 32. One of the third and fourth conduits 13 and 17, which are connected to respective working chambers 8.1 and 9.1, open into the other circular groove 38 with the sliding member in the closed position as in FIG. 1. The other third and/or fourth conduit 13,17, which are connected with respective working chambers 8.2 and/or 9.2, conducts pressurized medium from the first circular groove 32. The sliding member 37 with its left control piston 31 disconnects the connection between the working chamber 8.1 and working chamber 8.2 and/or between working chamber 9.1 and 9.2. The right control piston 35 is positioned to connect an additional circular groove 39 with the second circular groove 33 in the passage 36, so that the second conduits 12 opening into the second circular groove 33 from the working chambers 6.1 and 6.2 are connected by the additional circular groove 39 with a duct 40 leading to the lubricant inlet. The pressure chambers 11 of the pump means 1 are thus depressurized by this connection so that no high pressure can build up here. Because of that, the working chamber 8.1 is separated from the working chamber 8.2, and no pressurized medium can flow from the working chamber 8.1 to working chamber 8.2 when forces are applied to the drive wheel 3 of the camshaft to drive the camshaft. The camshaft then moves synchronously with the drive wheel 3 since the connected working chambers 8.1 and 8.2 and/or 9.1 and 9.2 are located between adjusting segments which are coupled by the feather keys with the drive wheel 3, and between the adjusting segments 23, which are coupled by the feather keys with the camshaft, in the rotation direction.

If an adjustment of the position of the camshaft relative to the drive wheel is to be performed, the control means 19 is operated at a suitable point in time by the electromagnetic device 18 and the sliding member 37 is pushed against the force of the spring 34, so that the right control piston now closes the additional circular groove 39 and thus separates the pressure chamber 11 from the lubricant inlet so that the left control piston 31 is positioned to provide a connection between the other circular groove 38 and the first circular groove 32. Because of that, the working chamber 8.1 is connected with the Working chamber 8.2 and/or the working chamber 9.1 is connected with the working chamber 9.2. Thus the adjusting segments which are connected with the drive wheel 3 move relative to the adjusting segments 23 connected with the camshaft via the rotary piston according to the torque applied to the drive wheel by the camshaft 2. During this adjustment also the volumes of the working chambers 7.1 and 7.2 change. Since these chambers are however vented, they do not prevent the motion of the camshaft relative to the drive wheel. These chambers are above all additional, since the segments 23 which bound the working chambers 6.2 and 8.1 and/or 9.1 and 6.1, can move to and from each other.

The connection between the working chambers 8.1 and 8.2 lasts until the desired relative motion between the camshaft 2 and the drive wheel 3 has occurred or until the torque from the camshaft 2 in the desired direction ends because of a torque applied in the opposite direction. During the oscillation of the camshaft called for by the operation of the valves gas engine torques, which act in the direction of the desired adjustment between the camshaft 2 and the drive wheel 3, are used. A sufficient torque peak does not occur during this oscillating motion, to complete the desired adjustment, so the next occurring torque peak must also be utilized, which must be accomplished again by opening the sliding member after an intervening closing of the sliding member.

Besides the above-described camshaft position adjustment using the torque peaks for the torque fluctuations experienced by the camshaft as in the prior art devices, in the preferred embodiment of the invention an adjustment in the relative position of the camshaft and drive wheel occurs additionally by action of the pump 1, which can build up additional pressure because of separation from the lubricant inlet or which can decrease the pressure which causes an adjustment in the opposite direction as described above in relation to FIGS. 4 and 5.

The invention is not limited in its embodiment to the preferred embodiment example given above. There are, rather, a number of variants conceivable which make use of the solution presented, even if the embodiments are of a fundamentally different type.

While the invention has been illustrated and described as embodied in a device for adjusting the rotational angle relationship between a camshaft and its drive element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Adjustment device for continuously adjusting an angular orientation of a camshaft of an internal combustion engine relative to a drive element of the internal combustion engine, said adjustment device comprising:
    servomotor means connectable to receive a pressurized medium for adjustment of the angular orientation of the camshaft relative to the drive element, said servomotor means being provided with at least one first pair of working chambers (8.1, 8.2; 9.1, 9.2) for said pressurized medium, said first working chambers being connectable in pairs in operation to allow a flow of said pressurized medium between said working chambers of each of said pairs and being defined by enclosed volumes in said servomotor means, said volumes being changeable by predetermined volume amounts as a result of a flow of said pressurized medium between said working chambers;
    pump means for feeding an additional pressurized medium to and from at least one second pair of working chambers (6.1, 6.2) of the servomotor means, said pump means being located in the drive element of the internal combustion engine;
    first control valve means (20) connected to the pump means for controlling supply of the additional pressurized medium to and from the pump means of said at least one second pair of working chambers (6.1, 6.2); and
    second control valve means connected to the servomotor means for selecting said at least one first pair of said working chambers and for connecting said working chambers of said at least one first pair of working chambers to allow a flow of said pressurized medium between said working chambers of said working chamber pairs so selected as a result of torque alterations imposed by the cam drive and thus to provide an adjustment of said angular orientation of said camshaft relative to said drive element.

2. Adjustment device as defined in claim 1, wherein said pairs of said working chambers consist of four pairs.

3. Adjustment device as defined in claim 1, wherein said pressurized medium consists of a hydraulic medium.

4. Adjustment device as defined in claim 1, wherein the servomotor means includes a rotary piston nonrotatably connected with the camshaft, the drive element is a drive wheel connected with the internal combustion engine to be driven by the internal combustion engine, and the servomotor has a plurality of adjusting segments attached to the outer peripheral surface of rotary piston and positioned between the drive wheel and the rotary piston and another plurality of adjusting segments attached to an inner surface of the drive wheel and positioned between the rotary piston and the drive wheel, each of said adjusting segments attached to the rotary piston being positioned between two of said adjusting segments attached to said drive wheel so that each of said working chambers is bounded by the rotary piston, the drive wheel, one of the adjusting segments attached to the rotary piston and one of the adjusting segments attached to the drive wheel.

5. Adjustment device as defined in claim 1, further comprising electromagnet means connected to the first and second control valve means for operation of the first and second control valve means to activate the first control valve means to connect and disconnect said pump means and said at least one second working chamber and to supply said additional pressurized medium to said pump means and to activate the second control valve means to connect said at least one first pair of working chambers with one another so that said pressurized medium can flow therebetween.

6. Adjustment device as defined in claim 1, wherein said pump means consists of a symmetrical, two-cylinder ball pump having a two-stroke cam and provided with two pressure chambers for the pressurized medium.

7. Adjustment device as defined in claim 6, wherein the two-stroke cam comprises a cam ring.

8. Adjustment device as defined in claim 7, wherein the cam ring is shaped to provide an elliptical cam stroke.

9. Adjustment device as defined in claim 7, wherein the cam ring is shaped to provide an oval cam stroke.

10. Adjustment device as defined in claim 7, wherein the cam ring is shaped to provide a trochoidal cam stroke.

11. Adjustment device as defined in claim 7, wherein the cam ring is shaped to provide a cam stroke having a sine squared shape.

12. Adjustment device as defined in claim 4, further comprising a lubricant circuit of the internal combustion engine containing a lubricant, and wherein said pump means consists of a symmetrical, two-cylinder ball pump having a two-stroke cam and provided with two diametrically opposed pressure chambers for the pressurized medium; said servomotor means being provided with eight of said working chambers and the rotary piston of the servomotor means is provided with first conduits, second conduits, third conduits and fourth conduits for connecting the working chambers, and the working chambers of at least one second pair of said working chambers (6.1, 6.2) are connectable by the first control valve means (21) to respective ones of the pressure chambers of the pump means via said first conduits and to the lubricant circuit of the internal combustion engine via said second conduits.

13. Adjustment device as defined in claim 12, wherein said two working chambers of said at least one second pair of said working chambers (6.1, 6.2) are diametrically opposed to each other.

14. Adjustment device as defined in claim 13, wherein the working chambers of a third pair of said working chambers (7.1, 7.2) are vented, arranged diametrically opposite to each other and are each located adjacent to one of said working chambers of said at least one second pair of said working chambers.

15. Adjustment device as defined in claim 14, wherein said at least one first pair of said working chambers consists of two pairs of said working chambers, each of said working chambers of each of said pairs of said at lease one first pair being located adjacent to one another and diametrically opposite to respective ones of said working chambers of the respective other pair of said at least one first pair of said working chambers and one of said working chambers of one of said at least one second and third pairs of said working chambers is located adjacent to one of said working chambers of each of said pairs of said at least one first pair of said working chambers.

16. Adjustment device as defined in claim 15, wherein said working chambers of said two first pairs are connectable and disconnectable with each other via said third and said fourth conduits in the servomotor means respectively.

17. Adjustment device as defined in claim 16, further comprising electromagnet means connected to the first and second control valve means for operation of the first and second control valve means.

18. Adjustment device as defined in claim 17, wherein said control means for controlling said servomotor includes means for connecting the pressure chambers of the pump means to the lubricant circuit when said third and fourth conduits are closed.

19. Adjustment device as defined in claim 12, wherein the pressurized medium is a hydraulic medium and the hydraulic medium consists of the lubricant of the lubricant circuit of the internal combustion engine.

* * * * *